May 24, 1927.
C. H. GUNTHORPE, SR
1,629,786
VEHICLE WHEEL GRIP MEMBER
Filed March 29, 1926
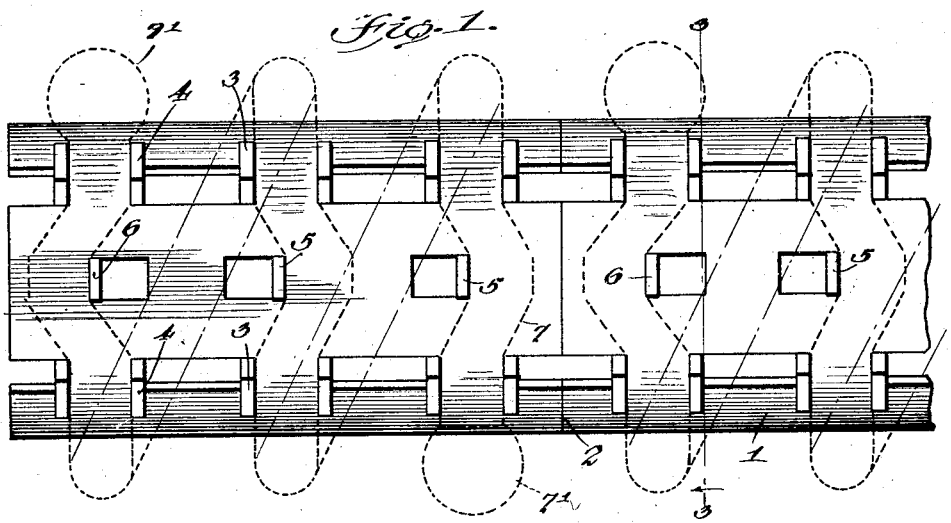
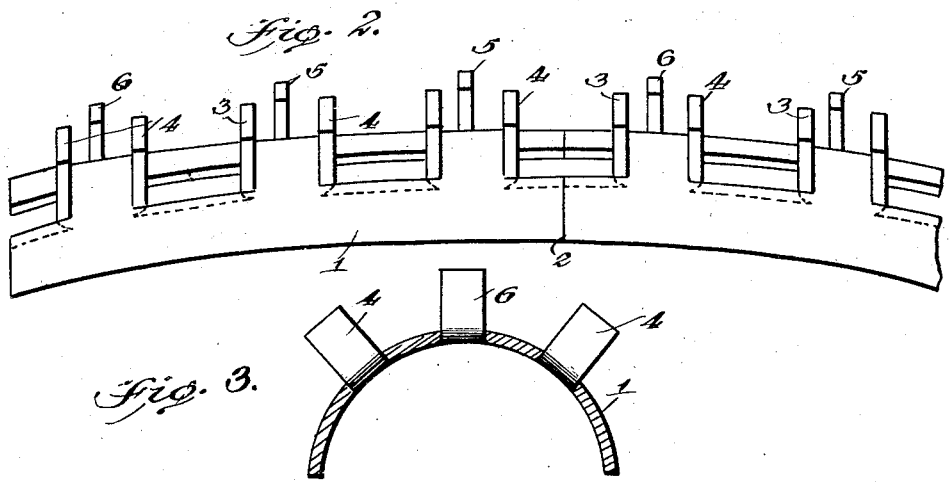
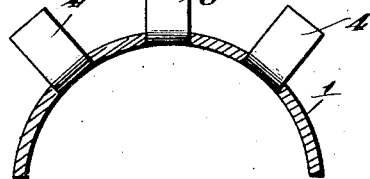
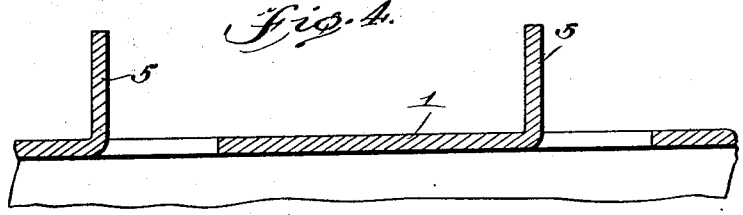
WITNESSES
INVENTOR
C. H. Gunthorpe, Sr.,
BY
ATTORNEYS Patented May 24, 1927.

1,629,786

UNITED STATES PATENT OFFICE.

CHARLES H. GUNTHORPE, SR., OF PORT ARTHUR, TEXAS.

VEHICLE WHEEL-GRIP MEMBER.

Application filed March 29, 1926. Serial No. 98,258.

My invention relates to improvements in devices for application to vehicle wheels and particularly to the tire of an automobile wheel to prevent spinning of the wheel on a slippery surface or in mud, and it consists in the combinations, constructions and arrangements herein described and claimed.

An object of the invention is the provision of a grip member of the character described which can be quickly and easily applied to a vehicle wheel, even though the vehicle wheel be resting in mud, and which affords facilities for supporting the convolutions of a rope or like flexible traction member which is wrapped around the rim portion of the associated wheel, so that portions of the rope will extend across the periphery of the wheel tire and will be held against sliding circumferentially of the wheel, whereby the periphery of the wheel will grip the surface on which the tire rests.

A further object of the invention is the provision of a vehicle wheel grip member of the character described which is simple in construction, reliable in use and thoroughly practical commercially.

Other objects and advantages of the invention will be apparent from the following description, considered in conjunction with the accompanying drawings, in which Figure 1 is a fragmentary plan view of a grip member embodying the invention, showing in dotted lines the convolutions of a rope which has been wound about the grip member, Figure 2 is a side elevation of the structure shown in Figure 1 with the rope omitted, Figure 3 is a section substantially along the line 3—3 of Figure 1, and Figure 4 is a fragmentary vertical section extending longitudinally of the grip member and on an enlarged scale.

In carrying out the invention, I make use of a strip of relatively light gauge metal 1 of which a sufficient number may be employed to extend completely around the periphery of a tire, not shown, of an automobile wheel so that the ends of the strips abut each other, as at 2. Each strip 1 is bent to be convexo-concave in transverse sectional configuration to conform to the curvature of the peripheral portion of an automobile wheel tire. The strip 1 is formed at opposite sides of and equi-distant from its longitudinal median line with struck out portions to produce two parallel rows of spaced pairs of oppositely bent lugs 3 and 4, respectively, which are struck radially outward from the strip 1, the members or lugs of each pair thus being spaced longitudinally of the strip. Corresponding pairs of lugs 3—4 and corresponding lugs 3 and 4 at opposite edges of the longitudinal median line of the strip 1 are aligned transversely of the strip. In addition, the strip is formed along its longitudinal median line with spaced sets of circumferentially spaced lugs 5 and 6 which are struck outward from the strip and bent to position to extend radially outward from the strip. There are two lugs 5 and one lug 6 in each set and adjacent lugs of the middle row are spaced longitudinally of the strip 1 a distance greater than the distance between the lugs 3—4 of each pair and each lug 5 or 6 is located on a line which extends transversely of the strip 1 midway between the lugs 3—4 of adjacent pairs of lugs of the outer rows. Therefore, the lugs of the middle row are staggered with respect to the corresponding lugs of the outer rows. The lugs 5 are struck from the body of the strip 1 opposite to the lugs 6.

A flexible traction member, which may comprise lengths of rope indicated by dotted lines at 7 is wound about the strip 1 and about the tire, not shown, on which the strip 1 will be mounted in actual use. The convolutions of the rope on the outer face of the strip 1 will extend between the lugs 3—4 of adjacent pairs of lugs of the outer rows and across the face of the strip around the adjacent lugs 6 or 5 of the middle row of lugs, whereby the portion of each convolution of rope that extends on the outer face of the strip 1 between the outer rows of lugs, will be bent or held substantially in V-shape, as clearly shown in Fig. 1. Knots $7^1$ at the ends of each length of rope will engage with adjacent lugs 3—4 to hold that length of rope in place. The rope will serve to hold the strip 1 on the periphery of a wheel tire and in conjunction with the lugs, will provide an effective gripping means for biting into mud or a slippery surface so that the wheel will not slip and a vehicle with which the device is associated thus can be moved under its own power from a muddy or slippery surface. It will be manifest that a strip 1 and the rope can be applied to a wheel when the wheel is resting in the mud and in a position in which it would be difficult, if not practically impossible to apply an ordinary anti-skid chain.

The plate or strip 1 may be termed a shoe-plate for the tire of a vehicle wheel and will protect the tire on which it is disposed in addition to serving as a grip member for preventing slipping of the wheel on a slippery surface or mud.

One section of the grip may be applied to a wheel while the wheel is resting in mud. For slippery pavements, enough sections of the grip may be applied to extend completely around the wheel.

Obviously, the invention is susceptible of embodiment in forms other than that which is illustrated in the accompanying drawings, and I therefore consider as my own all such modifications and adaptations thereof as fairly fall within the scope of the appended claims.

I claim:—

1. A device of the character described comprising a metallic strip adapted to be applied to the periphery of an automobile wheel tire, said strip having longitudinally and transversely spaced outstanding lugs thereon, and a flexible traction member wound about the rim of the wheel and the strip on the rim and threaded between adjacent lugs on said strip, said strip being curved transversely to conform to the curvature of the peripheral portion of the associated wheel tire, said flexible traction member having knotted portions in engagement with adjacent lugs on said strip.

2. A device of the character described comprising a strip of light gauge metal adapted to encircle the tread of an automobile wheel tire and to contact with the periphery of said tire, said strip being curved transversely to conform to the curvature of the peripheral portion of the associated tire, said strip being formed with longitudinally spaced pairs of outwardly turned lugs arranged in two rows respectively located at opposite sides of the longitudinal median line of the strip, the lugs of each pair being struck oppositely from the body of the strip, and a flexible traction member wound about the rim of the wheel and about the strip on said wheel tire, the convolutions of said flexible traction member extending between adjacent pairs of lugs of each of said rows of lugs on the strip.

3. A device of the character described comprising a strip of light gauge metal adapted to encircle the tread of an automobile wheel tire and to contact with the periphery of said tire, said strip being curved transversely to conform to the curvature of the peripheral portion of the associated tire, said strip being formed with longitudinally spaced pairs of outwardly turned lugs arranged in two rows respectively located at opposite sides of the longitudinal median line of the strip, the lugs of each pair being struck oppositely from the body of the strip, a flexible traction member wound about the rim of the wheel and about the strip on said wheel tire, the convolutions of said flexible traction member extending between adjacent pairs of lugs of each of said rows of lugs on the strip, said strip also being formed with a row of outstanding lugs extending along the longitudinal median line of the strip, the lugs of said last named row being arranged in sets of three lugs, two of which are struck from the body of the strip oppositely to the remaining lug and all of said lugs being turned outward, the distance between adjacent lugs of the last named row being greater than the distance between the lugs of the pairs of lugs of the first named rows, the lugs of the last named row being located along lines which extend transversely of the strip midway between adjacent pairs of lugs of the first named row, the lugs of the last named or middle row also being engaged with the convolutions of said flexible traction member.

CHARLES H. GUNTHORPE, Sr.